(12) United States Patent
Gower

(10) Patent No.: US 6,325,085 B1
(45) Date of Patent: Dec. 4, 2001

(54) FLEXIBLE PROTECTIVE SYSTEM TO PREVENT PENETRATION OF WIND BORNE MISSILES

(75) Inventor: Ted Gower, N. Palm Beach, FL (US)

(73) Assignee: Targus International Company, Palm Beach Gardens, FL (US)

( * ) Notice: Subject to any disclaimer, the term of this patent is extended or adjusted under 35 U.S.C. 154(b) by 0 days.

(21) Appl. No.: 09/565,211

(22) Filed: May 4, 2000

Related U.S. Application Data

(63) Continuation-in-part of application No. 09/270,249, filed on Mar. 15, 1999, now Pat. No. 6,176,050, which is a continuation-in-part of application No. 08/861,209, filed on May 21, 1997, now abandoned.

(51) Int. Cl.[7] .................................................. E04H 12/20
(52) U.S. Cl. ............................... 135/90; 52/202; 52/222; 135/115; 135/913
(58) Field of Search ............................ 52/3, 4, 260, 23, 52/144, 145, 202, 203, 222, DIG. 11; 135/88.01, 90, 115

(56) References Cited

U.S. PATENT DOCUMENTS

| 5,522,165 | * | 6/1996 | Molla | 40/604 |
| 5,535,565 | * | 7/1996 | Majnaric | 52/426 |
| 5,579,794 | * | 12/1996 | Sporta | 135/88.01 |
| 5,687,512 | * | 11/1997 | Spoozak | 52/23 |
| 6,161,339 | * | 12/2000 | Cornett | 52/23 |
| 6,176,050 | * | 1/2001 | Gower | 52/222 |
| 6,230,455 | * | 5/2001 | Arehart | 52/202 |

* cited by examiner

Primary Examiner—Beth A. Stephan
(74) Attorney, Agent, or Firm—McHale & Slavin, P.A.

(57) ABSTRACT

A flexible material is included within a structure to prevent wind borne missiles or debris from penetrating the confines of the structure. The flexible material may be included within the confines of a building in a free standing form or incorporating one or more interior walls of the building or structure. The flexible material may be attached to the exterior of a structure to cover openings in the structure.

20 Claims, 4 Drawing Sheets

FLEXIBLE PROTECTIVE SYSTEM TO PREVENT PENETRATION OF WIND BORNE MISSILES

This application is a continuation in part of Ser. No. 09/270,249, filed Mar. 15, 1999 now U.S. Pat. No. 6,176,050, which is a continuation in part of Ser. No. 08/861,209, filed May 21, 1997 now abandoned. The entire contents of both applications are incorporated herein by reference.

FIELD OF THE INVENTION

This invention relates to the protection of property against high winds and, in particular, to a flexible protective barrier device placed on or inside a structure for securing property against the force of winds and from impact of foreign objects carried by the wind as occasioned by hurricanes, tornadoes and the like.

BACKGROUND OF THE INVENTION

There are various types of hurricane shutters that are attached to the outside of buildings to cover openings in the structure, such as windows and doors, to provide protection from high winds and debris. Usually, these shutters are constructed of rigid materials which will withstand significant impact, by wind or objects, and maintain their integrity. In order for the shutters to be effective, all the openings in the entire structure must be covered. The shutters, themselves are expensive and require time and skill to install or remove.

Flexible materials, such as netting, tarpaulins and blankets have been used to protect and anchor vehicles, mobile homes and other shelters. These materials are also placed on the outside of the objects to which they are attached and should cover the entire object. An example of such materials is shown in U.S. Pat. No. 5,579,794 to Sporta. While these materials do not significantly contribute to the structural integrity of the enclosed object, they do provide protection from flying debris. With these flexible materials, it is important that they are anchored in such a manner that the deflection caused by the wind speed does not exceed the distance between the material and the enclosed structure. In such an instance, the enclosed structure could sustain damage or breakage without penetration of debris through the flexible materials. Further, if the flexible materials are anchored over large spans without support, chafing may occur in the materials between the anchoring mechanism and/or the protected structure.

Because both the rigid shutters and the flexible materials reduce or eliminate the ingress and egress from the protected structures, they are not normally deployed. Therefore, a warning should be given which allows enough time to deploy the protective devices. As has been demonstrated over and over, forecasting the onset of hazardous weather is notoriously unreliable. Sometimes, because of the vagaries of the weather and the forecasting, there is not enough time before the storm hits to completely install such systems.

Thus what is lacking in the art is a inexpensive protective barrier that can be included on or inside a portion of a structure or quickly deployed on or within a portion of a structure for protecting the occupants and the property.

SUMMARY OF THE INVENTION

This invention contemplates the use of a flexible barrier of woven synthetic textile that is able to satisfy stringent testing criteria. Certain types of flexible material capable of withstanding high impact loads without bursting, can be disposed within some or all of the walls of the building or other structure to provide continuous protection for the occupants and property.

Further, the invention contemplates the use of the synthetic textile as an enclosure within the building or structure. The enclosure could be free standing or incorporate one or more interior walls of the building or structure.

The invention also contemplates the use of the synthetic textile material deployed on the outside of buildings to cover small openings such as windows and doors.

Accordingly, it is an objective of the instant invention to teach the use of a synthetic textile within the walls of some or all of the rooms of a structure. The material may be disposed and secured between the inner finished wall and the sub assembly of studs or other support structure. In less expensive installations, the walls of a particular room, both inner and outer, may be reinforced to provide a safe room more resistant to missile impact than the rest of the structure.

It is a further objective of the instant invention to teach the use of a synthetic textile material which can be quickly mounted to fasteners in a wall and in the floor of a room to provide missile impact protection inside the room.

It is yet another objective of the instant invention to teach the use of a free standing enclosure of synthetic textile material within a structure. The enclosure is removably anchored to the supporting structure.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
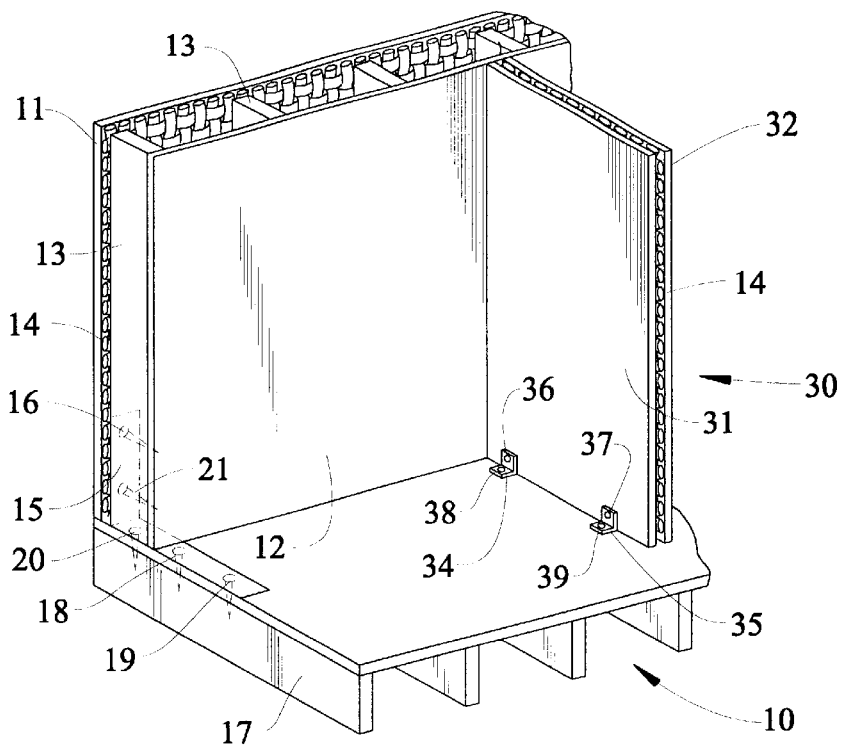
FIG. 1 shows an elevation of an interior room, partially in section, with reinforcements and the synthetic material installed.

In FIG. 1 a portion of a structure 10 is shown with an outer wall panel 11, an inner wall panel 12, a stud or other subassembly 13, and the synthetic textile material of this invention 14. The textile material 14 is fastened to the subassembly 13 by any manner of mechanical or chemical fastening means, for example staples, nails or adhesive. The textile material may also be fastened to the interior wall in the same manner.

All the walls of the structure 10 may have the textile material 14 sandwiched between the wall panels. Although the textile is readily applied to the standard wall constructions, in order to maximize the benefits to the structure, each of the walls should have extra bracing and crossbracing. As shown in FIG. 1, the outer wall panel 11 is connected to an extra bracket 15 by bolt 16. The bracket is also connected to the floor pan 17 by bolts 18 and 19. The bracket 15 is connected to the subassembly 13 by bolt 20 and to the inner wall panel 12 by bolt 21. There would be similar brackets connecting the top edge of the inner and outer walls to the ceiling joists. The extra brackets would be spaced along the walls according to applicable building codes.

The interior wall 30 is shown having opposing wall panels 31 and 32 with brackets 34 and 35 anchoring the interior walls to the floor pan. Other similar brackets anchor the wall to ceiling joists (not shown). The textile material 14 is sandwiched between the panels. In some lighter constructions, there is no studding nor a subassembly in interior walls which necessitates fastening the textile material to each interior wall panel. In heavier construction there are studs or other subassemblies present between the interior wall panels, such as shown in the exterior wall in FIG. 1.

As shown in FIG. 1, the interior wall panels have extra brackets 34 and 35 which reinforce the connection between the interior walls and the floor pan. Brackets 34 and 35 are shown attached to the interior wall with bolts 36 and 37 and to the floor pan by bolts 38 and 39. These extra braces give the interior walls more strength than the normal manufacture. The brackets would be spaced along the interior walls as dictated by the underlying subassemblies and building codes.

A less expensive and lighter construction involves using the textile material and the extra bracing in the walls of only one room of the whole structure. The particular room selected for the reinforcement could be a living space, such as a bedroom, or a utility space, such as a bathroom or closet. In addition to the textile material sandwiched in the walls, in a preferred embodiment, the selected safe room would have the additional bracing and crossbracing, as shown in FIG. 1.

Figure 2:
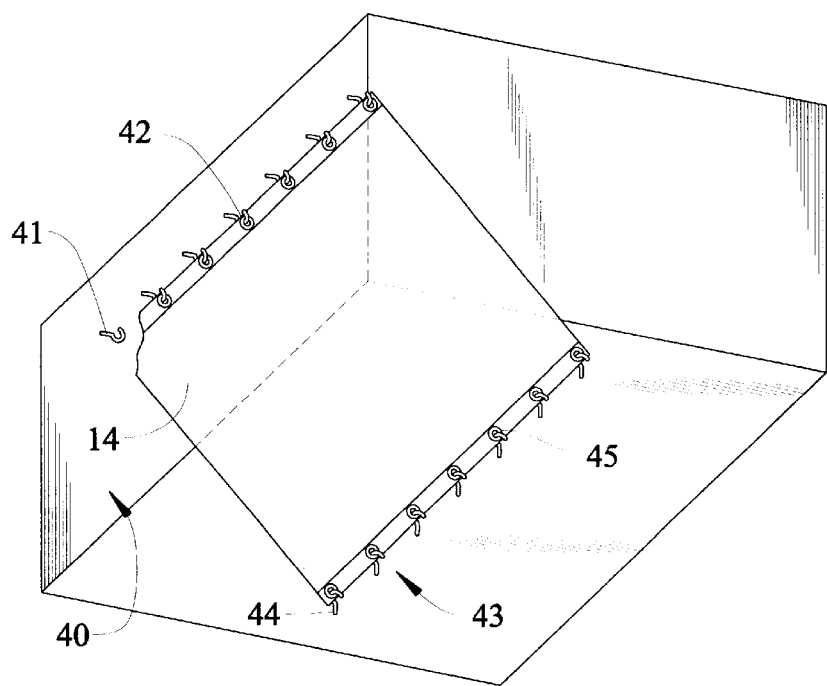
FIG. 2 shows an elevation of an interior room with the synthetic material deployed.
Figure 4:
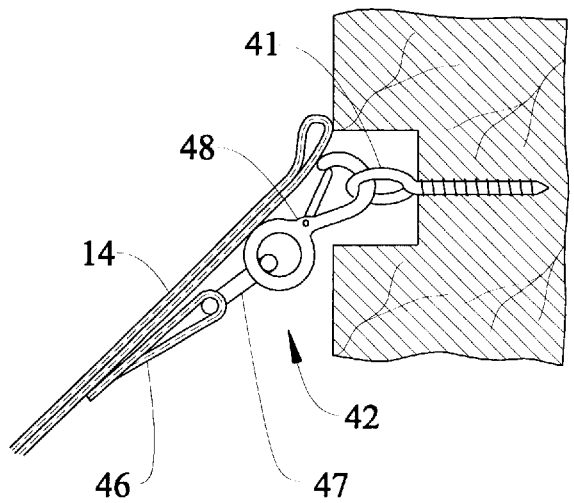
FIG. 4 shows a cross section of a fastener for the edge of the synthetic material.
Figure 5:
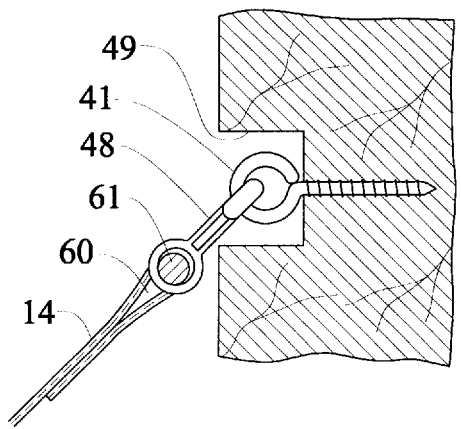
FIG. 5 shows a cross section of another fastener for the edge of the synthetic material.
Figure 6:
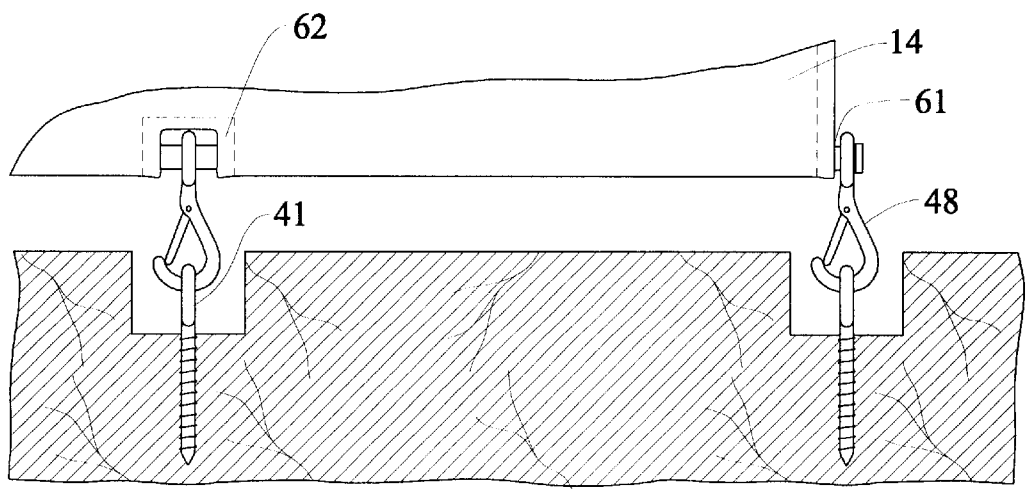
FIG. 6 shows a cross section of another fastener for the edge of the synthetic material.

FIG. 2 shows another less expensive embodiment of the safe room. The textile material 14 is connected to an interior or exterior wall 40 near the ceiling of the room. Preferably, the textile material should be connected to an inner wall. As shown, the interior angle between the wall and the textile material is approximately 45 degrees. The angle may vary because of the limitations in the structure in which the textile material is used but the angle would always be acute. The slope of the textile material would serve to lessen the load placed on the material by debris falling from above. The angle between the wall and the material also determines the amount of space encompassed under the material. Considering an average adult to be about 6 feet tall and weigh about 170 pounds, such an adult sitting on the floor, with his back against the wall, would require approximately 3 feet in height, 3 feet in depth and 3 feet in width. Using a span of 8 feet for the textile material, ie. the hypotenuse of a right triangle formed by the interior wall, the floor and the textile material, as shown in FIG. 2, several adults can be accommodated. The distance, along the wall, that the textile material may deployed is limited only by the dimensions of the structure. The wall 40 has a line of fasteners 41 mounted along the upper portion, approximately 5 feet above the floor, in recesses 49. These fasteners cooperate with fasteners 42 in the edge of the textile material. The fasteners 42 are constructed, as shown in FIG. 4, with loops 46 fixed to the material, rings 47 threaded through the loops and the base of the clamps 48. In FIG. 6 the edge of the textile material is formed as a tunnel 60 with a rod 61 disposed therein. At spaced intervals along the edge reinforced grommets 62 are formed exposing the rod for connection with the fasteners 41. The fasteners 41 may be eye bolts, as shown in FIGS. 4, 5 and 6, or hooks which are installed in the wall in such a manner as to have a failure limit higher than the burst strength of the textile material. Rather than eye bolts or hooks, the wall fasteners may be internally threaded holes which accept bolts mounted in the edge of the textile material. The material extends downwardly from the wall to another set of anchoring devices 43 located in the floor pan approximately 5 feet from the wall 40. The anchoring devices 43 may be threaded holes 44 which accept cooperating bolts 45 fixed in the edge of the textile material. The anchoring devices 43 may be formed in the same manner as the upper fasteners 42. The textile material 14 forms a lean-to shelter which provides a protected space for the occupants. The lean-to is preferably located on a continuous wall, without apertures, near a corner of continuous walls so that only one end of the lean-to is open. In this embodiment, it may be desirable for the textile material to be somewhat transparent.

Figure 10:
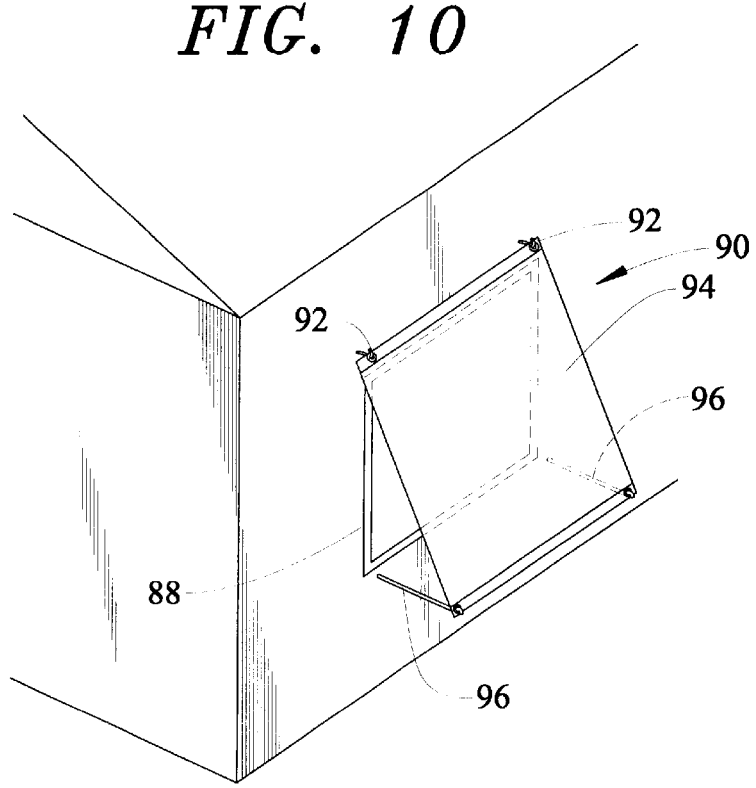
FIG. 10 shows an elevation of a window with the textile deployed.

A variation of the lean-to of FIG. 2 is shown in FIG. 10. The lean-to 90 is mounted to prevent direct impact of wind blown missiles onto the glass of window 88. The textile is secured by fastners 92 at the upper coners of the window. The bottom of the textile is mounted on extension fastners 96 at the bottom corners of the window. The length of the extensions 96 provide adequate space between the textile and the glass to decelerate missiles and prevent the glass from breaking.

It is desirable to have the wall 40 reinforced with extra bracing and cross bracing such as shown in FIG. 1. A complete enclosure 50 is shown if FIG. 3. The enclosure is fixed to the floor pan of the structure. The enclosure 50 has internal supports 51 and 52. These supports may be metal or plastic rods or the like, preferably, preformed in a bow shape. The ends 53, 54, 55, and 56 of the internal supports may be anchored to the floor pan with the fasteners such as shown in FIGS. 4, 5, and 6. The textile material 14 may have sleeves formed in the material to removably receive the supports 51 and 52. In another embodiment, the textile material may be placed over the supports and the peripheral edges of the textile material fixed to the floor pan by fasteners 57. The fasteners 57 may be formed in the same manner as the fasteners 41 and 42 shown in FIGS. 4, 5, and 6.

Figure 3:
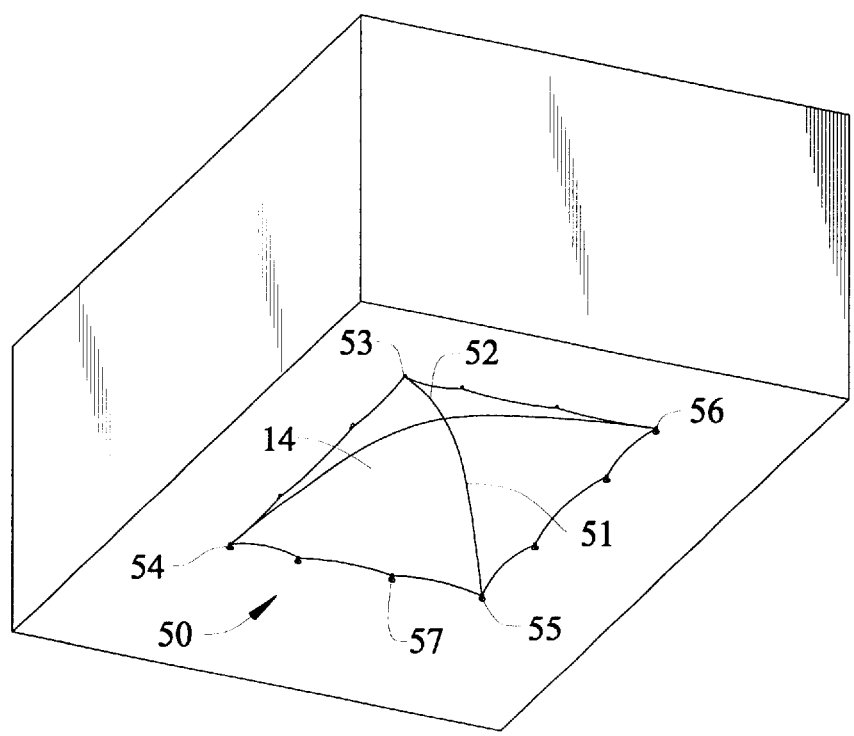
FIG. 3 shows an elevation of a free standing enclosure of the synthetic material anchored within a structure.
Figure 9:
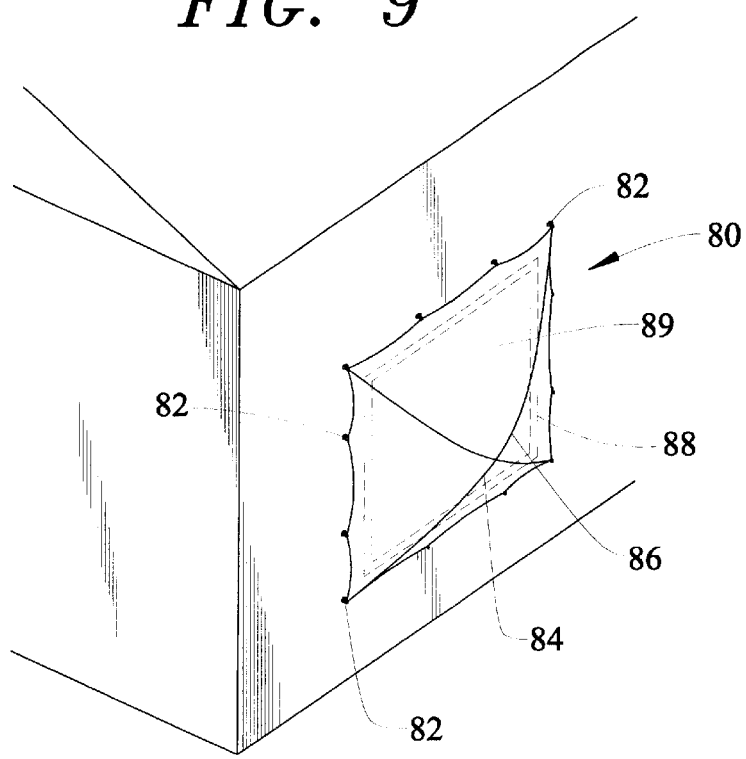
FIG. 9 shows an elevation of a window with another free standing enclosure anchored thereabout.

A structure similar to that shown in FIG. 3 is shown in FIG. 9. The window tent 80 is mounted to enclose the window 88 to prevent wind blown missiles from penetrating the glass. The textile material 89 is reinforced by the supports 84 and 86. The supports are bowed outwardly to provide space between the textile and the glass for deceleration or wind blown debris. The supports 84 and 86 are anchored at the corners of the window by fastners 82. Additional fastners 83 may be used to fix the sides of the window tent to the structure.

Figure 8:
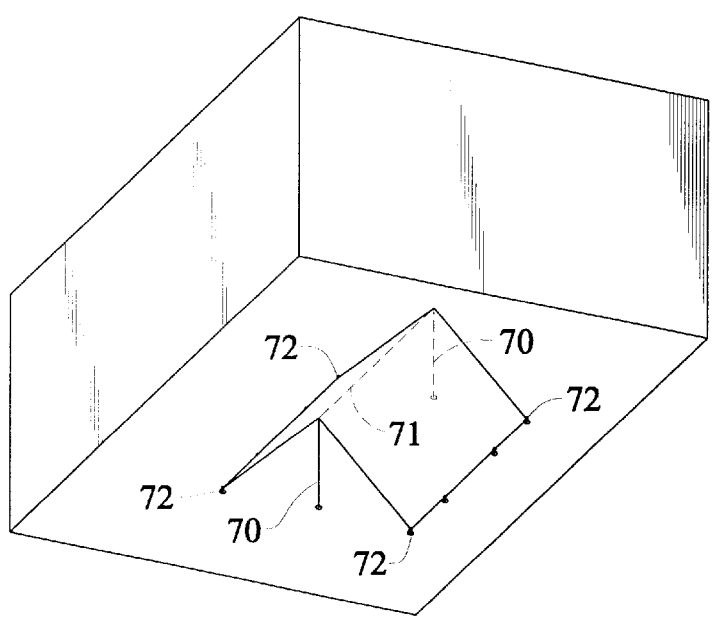
FIG. 8 shows an elevation of another free standing enclosure anchored within the structure.

Another embodiment of a free standing enclosure is shown in FIG. 8. The vertical supports 70 hold up a ridge pole 71. The edges of the textile material are anchored to the floor by fasteners 72 which are similar to the fasteners shown in FIGS. 4, 5, and 6. The textile material extends over the ridge pole 71 forming a tent—like structure.

The supports in FIGS. 3 and 8 are necessary to provide space for deceleration of debris between the periphery of the enclosure and the occupants. As stated above, a seated adult will require approximately 3 feet height. Therefore, the height of the enclosure should be at least 4 feet. The span of the textile material making up the sides of the enclosure should be approximately 8 feet from the apex of the enclosure to the floor.

FIGS. 4, 5, and 6 show different embodiments of the fasteners that are used to attach the flexible material to the inner or interior walls and floor of a structure. In all the fastener embodiments, the connection between the edges of the textile material and the fasteners has a higher failure strength than the textile material, itself.

Figure 7:
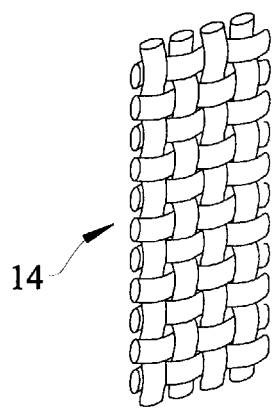
FIG. 7 shows an elevation of the synthetic material.

FIG. 7 illustrates a preferred construction of the textile material 14 of this invention. A suitable material is polypropylene formed in a monofilament and woven into a geotextile (style 20458) manufactured by Synthetic Industries of Gainesville, Georgia. The fabric is woven in a basket (plain) weave, as shown in FIG. 7, where the fill threads and the warp threads alternately cross over and under adjacent fills and warps. While a woven material is shown, the material may be knitted, nonwoven or extruded with apertures formed therein. In the preferred embodiment, the interstices are substantially equal to 0.6 millimeter.

The selection of interstice size and configuration is dependent on the amount of transparency and air passage desired. Another consideration is the maximum size object that may penetrate the interstice. In some jurisdictions, it has been determined that wind blown debris of ³⁄₁₆th of an inch or less poses no threat. Therefore, the weave construction must prevent passage of debris ³⁄₁₆th of an inch or greater. Also, this textile material is approximately 95% closed which greatly reduces the velocity of the wind passing through the material. For example, the velocity of a 100 mph wind is reduced approximately 97% by passing through the material of this invention.

The preferred type of fabric will stretch approximately 20–22% just prior to failure, depending on manufacturing technique, and will fail under a force of approximately 675 psi.

With regard to the lean-to, shown in FIG.2, it is important to determine the distance between the wall and the fasteners securing the lower edge of the textile material to the floor. This space is necessary to decelerate a wind blown missile before ultimate failure of the textile material. The lean-to must include this amount of space, in addition to the amount of space required for the occupants, to insure that a missile will not strike someone inside the lean-to.

EXAMPLE

Dade County, Fla.

In Dade County, Florida building codes require a flexible barrier to withstand a force of 61.3 psi before failure. To determine the stretch factor:

$$\frac{\text{test load}}{\text{maximum load}} \times \% \text{ stretch at maximum load} = \text{stretch factor}$$

Or

-continued $$\frac{61.3}{675} \times 21 = 1.9\%$$

Assuming the room shown in FIG. 2 has an eight foot ceiling and the distance between the top edge and bottom edge of the lean-to is approximately 8 feet, the actual stretch will be:

stretch factor×height=actual stretch Or 96 in. X 1.9%=1.83 in.

To calculate deflection of the lean-to a right triangle is used such that the hypothenuse is ½ of the sum of the height plus stretch (96+1.83/2=48.92 in.) The known side is 96/2= 48 inches. Thus the deflection equals the square root of the difference between the square of the hypothenuse less the square of the known side or 9.4 inches. Therefore, the wall of the lean-to should be spaced approximately 9.4 inches from the area to be protected in order to decelerate a missile before failure. This means that the bottom edge of the lean-to should be about 9.4 inches from the inner or interior wall that holds the top edge plus the distance needed for the occupants.

The relationship between span and maximum deflection of the preferred textile material can be shown in a table:

| Height in feet | Deflection in inches |
|---|---|
| 8 | 9.4 |
| 10 | 11.8 |
| 12 | 14.1 |
| 14 | 16.5 |

These same type calculations can be used to determine the amount of space necessary inside the enclosure shown in FIG. 3. In any event, the size of the space beneath the lean-to or the enclosure will be many times the minimum deflection distance calculated here.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A flexible protective barrier device for protecting a portion of a structure from the force of wind and objects carried thereby, said structure including inner and outer walls circumscribing an enclosed space, a floor and a roof, said device comprising:

a synthetic textile material connectable to said structure within said enclosed space, said textile material having a fail strength of at least 61.3 pounds per square inch and an ultimate stretch up to 22 percent, said textile material having interstices in the range of 0.6 to 4.8 millimeter.

2. A flexible protective barrier device of claim 1 wherein said outer wall and said inner wall are connected to said floor and said roof by a subassembly therebetween, said synthetic textile material adapted to be connected to said subassembly throughout said structure.

3. A flexible protective barrier device of claim 2 wherein said structure includes interior walls dividing the space circumscribed by said inner and outer walls, said synthetic textile material affixable to said interior walls.

4. A flexible protective barrier device of claim 3 wherein said synthetic textile material is affixable to a portion of said interior walls.

5. A flexible protective barrier device of claim 2 wherein said synthetic textile material is connectable to said subassembly throughout a portion of said structure.

6. A flexible protective barrier device of claim 1 wherein said synthetic textile material is formed as a sheet having two opposing edges, one edge connectable to a wall and the other edge connectable to the floor, said sheet forming an acute angle with said wall.

7. A flexible protective barrier device of claim 3 wherein said synthetic textile material is formed as a sheet having two opposing edges, one edge connectable to a wall and the other edge connectable to the floor at least three feet from said wall.

8. A flexible protective barrier device of claim 1 wherein bow shaped supports are connectable to said floor, said synthetic textile material is disposed over said bow shaped supports and attached to said floor forming an enclosure.

9. A flexible protective barrier device of claim 1 wherein supports are connectable to said floor and said synthetic textile material is connected to said supports and said floor.

10. A storm survival kit for protecting a portion of the interior of a structure from the force of the wind and objects carried thereby, said kit comprising a textile material having a fail strength of between 61.3 and 675 pounds per square inch and interstices in the range of 0.6 to 4.8 millimeter, said textile material having at least two opposing edges, said edges having means for securing said textile material to said structure.

11. A storm survival kit of claim 10 including supports for said textile material, said supports having means for securing said supports to said structure, said textile material having more than two edges, said edges forming the periphery of an enclosed area, said edges having means for securing said textile material to said structure about said supports.

12. A storm survival kit of claim 11 wherein said supports are bow shaped.

13. A storm survival kit of claim 11 wherein said supports include vertical elements connected to a ridge pole.

14. A storm survival kit of claim 12 wherein said structure has at least one window and said supports extend diagonally across said window.

15. A storm survival kit of claim 10 wherein said structure has at least one window, said securing means in one of said opposing edges disposed above said window and said securing means in the other opposed edge disposed below said window, said securing means in the other opposed edge disposed below said window having extensions.

16. A process for protecting an interior area of a structure from wind generated force and objects carried thereby, said structure having upstanding walls and a floor defining said interior area, comprising the steps of;
 a) providing a textile material having a fail strength of at least 61.3 pounds per square inch and interstices in the range of about 0.6 to 4.8 millimeters,
 b) determining an amount of space to be protected,
 c) determining an amount of deflection necessary to decelerate a wind blown object before failure of said textile material, and
 d) attaching said textile material to an interior portion of said structure at intervals about said space to be protected, said intervals selected such that said deflection of said textile material does not intrude into said amount of space to be protected before failure.

17. A process for protecting the interior of a structure of claim 16 including the step of mechanically attaching said textile material to the walls of said structure.

18. A process for protecting an interior area of a structure of claim 16 including the steps of;
 a) providing a planar sheet having peripheral edges, said planar sheet having fasteners in two opposed edges,
 b) attaching said fasteners of one edge to at least one of said upstanding walls, and
 c) attaching said fasteners of said opposed edge to said floor.

19. A process for protecting an interior area of a structure of claim 16 including the steps of;
 a) providing an enclosure of said textile material, said enclosure having peripheral edges, said edges having fasteners for securing said edges to said structure,
 b) providing supports for said enclosure, said supports having fasteners for attaching said supports to said structure, and
 c) attaching said supports to said structure and to said textile material to position said enclosure within said structure.

20. A process for protecting an interior area of a structure of claim 16 wherein said structure has windows, including the steps of; attaching said textile material to an exterior portion of said structure about said windows.

* * * * *

EX PARTE REEXAMINATION CERTIFICATE (8212th)
United States Patent
Gower

(10) Number: US 6,325,085 C1
(45) Certificate Issued: May 10, 2011

(54) FLEXIBLE PROTECTIVE SYSTEM TO PREVENT PENETRATION OF WIND BORNE MISSILES

(75) Inventor: Ted Gower, N. Palm Beach, FL (US)

(73) Assignee: Armor Screen Corporation, Riviera Beach, FL (US)

Reexamination Request:
No. 90/009,417, Feb. 25, 2009
No. 90/010,528, May 6, 2009

Reexamination Certificate for:
Patent No.: 6,325,085
Issued: Dec. 4, 2001
Appl. No.: 09/565,211
Filed: May 4, 2000

Related U.S. Application Data

(63) Continuation-in-part of application No. 09/270,249, filed on Mar. 15, 1999, now Pat. No. 6,176,050, which is a continuation-in-part of application No. 08/861,209, filed on May 21, 1997, now abandoned.

(51) Int. Cl.
*E04H 12/20* (2006.01)
*E04H 9/14* (2006.01)

(52) U.S. Cl. ............... 135/90; 52/202; 52/222; 135/115; 135/913

(58) Field of Classification Search ............ None
See application file for complete search history.

(56) References Cited

U.S. PATENT DOCUMENTS

| | | |
|---|---|---|
| 351,860 A | 11/1886 | Gidden |
| 636,548 A | 11/1899 | Owen |
| 671,912 A | 4/1901 | Woodward |
| 964,455 A | 7/1910 | Smith |
| 3,288,159 A | 11/1966 | Corliss |
| 3,949,834 A | 4/1976 | Nusbaum |
| 4,283,888 A | 8/1981 | Cros |
| 4,397,122 A | 8/1983 | Cros |
| 4,484,420 A | 11/1984 | Stokes |
| 4,569,515 A | 2/1986 | Gordon |
| 4,815,562 A | 3/1989 | Denny et al. |
| 5,457,921 A | 10/1995 | Kostrzecha |
| 5,487,244 A | 1/1996 | Hill |
| 5,579,794 A | 12/1996 | Sporta |
| 5,791,090 A | 8/1998 | Gitlin et al. |

FOREIGN PATENT DOCUMENTS

| | | |
|---|---|---|
| FR | 2698119 | 5/1994 |
| IL | 102215/2 | 10/1966 |

OTHER PUBLICATIONS

Synthetic Industries Performance Fabrics Division, Style 20458: Woven Monofilament Geotextile (sent Aug. 30, 1996), 1 pg.*

* cited by examiner

Primary Examiner—Robert M. Fetsuga

(57) ABSTRACT

A flexible material is included within a structure to prevent wind borne missiles or debris from penetrating that confines of the structure. The flexible material may be included within the confines of a building in a free standing form or incorporating one or more interior walls of the building or structure. The flexible material may be attached to the exterior of a structure to cover openings in the structure.

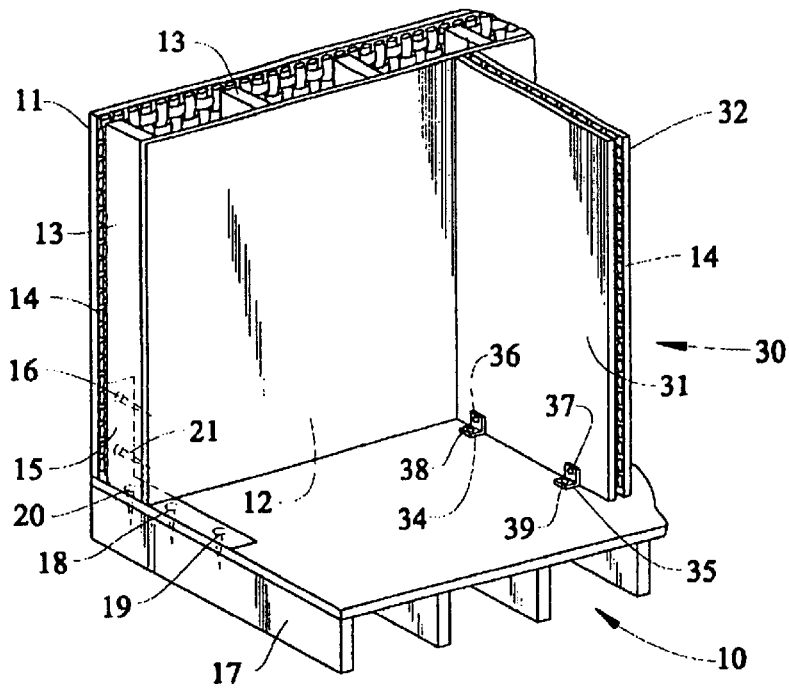

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 10 is cancelled.
Claims 1-9 and 11-20 were not reexamined.

* * * * *